United States Patent Office 3,549,409
Patented Dec. 22, 1970

3,549,409
PRODUCTION OF NONTHROMBOGENIC PLASTICS
Manfred F. Dyck, North Miami, Fla., assignor to Cordis Corporation, Miami, Fla., a corporation of Florida
No Drawing. Continuation-in-part of application Ser. No. 650,615, July 3, 1967. This application Apr. 28, 1969, Ser. No. 820,010
Int. Cl. A61k *17/18;* B44d *1/092*
U.S. Cl. 117—47                                    5 Claims

ABSTRACT OF THE DISCLOSURE

Plastics are rendered nonthrombogenic by heparinizing them following a treatment with a polyvalent metal salt dissolved in a solvent capable of swelling the plastic. The metal absorbed by the plastic is thus caused to bond heparin to the surface effectively to impart anti-coagulating properties.

---

This application is an continuation-in-part of application Ser. No. 650,615, filed July 3, 1967, and now abandoned. This invention is directed to the production of plastics having nonthrombogenic surface characteristics. Plastics of this type are in demand for use in prosthetic and therapeutic apparatus for handling blood under conditions where clotting would tend to occur.

When blood is brought into contact with plastics, glass or other strange surfaces, it tends to clot in a relatively short time unless precautions have been taken to prevent this. One common precaution currently under considerable investigation is the treatment of the surface with heparin, a substance known to have anticoagulant properties when in contact with blood. The presence of heparin on the surface is known to impart nonthrombogenic characteristics.

I have developed a new and improved method of treating numerous plastics to bond heparin to their surfaces in a very simple and effective manner. In particular my method provides a nonthrombogenic surface in a manner that does not in other ways adversely affect the blood as by increasing hemolysis as will happen in other known methods.

In carrying out my method I make use of the fact that heparin in solution will combine with certain polyvalent metals and form a remarkably stable bond. In this connection it will be noted that heparin is generally considered to be a high molecular weight (e.g. 16,000) tetrasaccharide which is highly negative on account of sulfate and sulfonate groups. The negatively charged molecule will bond effectively with polyvalent metals such as aluminium, zirconium, bismuth, zinc, silver, tin and antimony.

According to this invention the plastic material to be treated is contacted with a solution of a salt of one of the above metals in solvent which is capable of swelling the plastic, and which is also preferably water-miscible. After the plastic has been caused to swell in the metal salt solution it is removed and treated with an aqueous solution of heparin, whereupon heparin is caused to be bound to the plastic surface. In some cases, particularly where the metal salt solution is in a highly polar solvent, it may be necessary to contact the plastic with a basic solution, e.g. ammonium hydroxide, prior to treating it with heparin.

Plastics thus treated may be placed in contact with blood and will be found to exhibit greatly prolonged clotting times, depending on the nature of the plastic, the nature of the metal, the amount of metal present and the amount of heparin with which it has been caused to react.

My invention is based on the concept of physically incorporating the metal into the plastic by utilizing a solvent which will swell the plastic, and in so doing carry the metal in solution into it. Upon treatment of the swollen plastic with an aqueous heparin solution the metal, or perhaps its oxide or hydroxide, becomes bonded to the heparin molecule and has been found to hold it very effectively.

The following examples set forth representative methods for practicing this invention.

Example 1

Treatment of silicone rubber Tubing with $AlCl_3 6H_2O$.—
A salt solution was formed by dissolving 5 grams of $AlCl_3 6H_2O$ in a solvent mixture of 7 ml. tetrahydrofuran (THF), 4 ml. of methanol and 4 ml. of distilled water. A silicone rubber tube 60 cm. long x 1.5 mm. I.D. x 2.5 mm. O.D. was immersed in the solution for 1 hour at about 18° C. and then removed and rinsed thoroughly twice with methanol. The tube as next immersed for 22 hours in a heparin solution consisting of 0.5 gram of sodium heparin dissolved in 100 ml. of distilled water, and was then rinsed for 5 days in a standard saline solution.

After clamping off one end rabbit blood was injected into the tube, and the clotting time at 4° C. was found to be greater than 10 days. In untreated tubing the clotting time was less than 1½ hours.

The same procedural steps were followed in the examples reported in Table I, with other salts and solvents.

TABLE I.—TREATMENT OF SILICONE RUBBER

| Example | 2 | 3 | 4 | 5 |
|---|---|---|---|---|
| Salt 5 g | $BiCl_3H_2O$ | Aluminium subacetate | $ZnCl_2$ | $Zn(CH_3COO)_2\cdot 2H_2O$ |
| Solution: | | | | |
| Dimethyl formamide | | 2 ml | | 2 ml |
| THF | 15 ml | 13 ml | 12 ml | 10 ml |
| Methanol | | | | 8 ml |
| $H_2O$ | | | 3 ml | 7 ml |
| HCl 36% | | 0.1 ml | | |
| Clotting time | 8 days | 2 days | 2 days | 10 days |
| Remarks | Dried out | Clotted | Clotted | Dried out |

It has been observed that with certain metals, such as bismuth, increasing amounts of metal present in the plastic will result in corresponding reductions in clotting time, which is believed to be accounted for by an inactivation effect which occurs when the heparin is so effectively coupled with the salt that its function as an anticoagulant is impaired. For most effective results with a metal such as bismuth, the amount of the metal should be controlled to provide optimum heparin bonding.

This can be provided by varying either the concentration of the salt in the solution, or the immersion time of the plastic in the solution, or both. It is a matter of simple routine experimentation to determine the optimum treating conditions for any given system.

The following examples show how increasing the amount of bismuth present in the plastic (Silicone rubber tubing) affects the anticoagulant characteristics of the surface. In these examples the silicone tubing was immersed for varying periods of time in a solution made up by dissolving 5 grams of $BiCl_3$ in 15 ml. of THF. Following the immersion, the tubes were immersed in the aqueous heparin solution (0.5 gram of sodium heparin dissolved in 100 ml. of water) for 22 hours, rinsed in distilled water for 5 days and then immersed in normal saline solution for 15 minutes.

The treated tubes were tested for anticoagulating properties by injecting bovine blood into them and holding them at 25° C. The following results were observed.

TABLE II.—TREATMENT OF SILICONE RUBBER

| Example | Immersion time | Clotting time |
|---|---|---|
| 6 | 1 minute | 6 days. |
| 7 | 2 minutes | 36 hours. |
| 8 | 4 minutes | Do. |
| 9 | 6 minutes | Do. |
| 10 | 15 minutes | 24 hours. |
| 11 | 30 minutes | 2 hours. |

The same procedures as reported in Examples 6–11 were repeated using as the salt solution 5 grams of stannous chloride dissolved in 15 ml. of THF. Varying the immersion time in the same manner did not affect the clotting time, which, in each case, was found to be 6 days with bovine blood at 25° C.

The procedures of Examples 6–11 were repeated using polyurethane tubing (1.5 mm. ID x 2.5 mm. O.D. x 60 cm. long). The results are given in Table III.

TABLE III.—TREATMENT OF POLYURETHANE

| Example | Treating solution | Immersion time, min. | Clotting time, days |
|---|---|---|---|
| 12 | 5 grams SnCl₂¹ | 1 | 21 |
| 13 | do¹ | 2 | 21 |
| 14 | do¹ | 4 | 21 |
| 15 | do¹ | 6 | 21 |
| 16 | do¹ | 10 | 21 |
| 17 | do¹ | 15 | 21 |
| 18 | 5 grams BiCl₃¹ | 1 | 21 |
| 19 | do¹ | 2 | 21 |
| 20 | do¹ | 4 | 21 |
| 21 | do¹ | 10 | 10 |
| 22 | do¹ | 15 | 6 |

¹ Dissolved in 15 ml. acetone.

Cellulose, in the form of cellophane or cuprophane sheets, or as dialysis tubing, may also be rendered nonthrombogenic by treating it with a solution of the metal salt in a solvent such as water, methanol, or tetrahydrofurane, thereafter immersing the cellulose in a 1% ammonium hydroxide solution and thereafter contacting it with a heparin solution, or alternatively by following the salt solution treatment with immersion in a heparin solution containing ammonium hydroxide. In Examples 23 and 24 reported in Table IV, dialysis tubing was treated by tying a knot in a two foot sample of number 8 tubing, then filling the tube with the salt solution and letting it stand for 30 minutes. Following this each tube was filled with a one percent aqueous ammonium hydroxide solution which was left in for 5 minutes. The tube was then washed with distilled water and filled with a 0.5% aqueous heparin solution which was renewed after 30 minutes and again after 12 hours and removed after 19 hours. After washing in distilled water the tube was placed in a 0.9% sodium chloride solution for 117 hours. The tube was then filled with fresh bovine blood and tested for clotting, the times for which are reported in Table IV.

In Examples 25 and 26 the salt solutions were left in the tied off tubes for 30 minutes following which the tubes were washed with distilled water and then filled with a solution of 0.5 gram of heparin, 1 ml. ammonium hydroxide and 98.5 ml. of distilled water. This solution was changed after 30 minutes and again after 5 hours, and removed after 19 hours, following which a 0.9 sodium chloride solution was poured into the tubes and changed 3 times a day for 2 days. These were then filled with fresh bovine blood and the clotting times measured, as reported in Table IV.

TABLE IV.—TREATMENT OF CELLULOSE

| Example | 23 | 24 | 25 | 26 |
|---|---|---|---|---|
| Salt: | | | | |
| Zirconium tetrachloride, gr | 5 | | | |
| Bismuth chloride, gr | | 5 | | |
| Dibutyltin acetate, gr | | | 5 | |
| Aluminum seconder butoxide, gr | | | | 5 |
| Solvent: | | | | |
| Water, ml | 20 | 20 | | |
| Methanol, ml | 80 | 80 | 95 | |
| Tetrahydrofuran, ml | | | | 95 |
| Clotting time, hours | 300 | 275 | 275 | 275 |

Other plastics may also be treated according to this invention as shown by the examples below. In each of these (unless otherwise noted) the treatment consisted of immersing the plastic in the treating solution for the time and temperature given. Following that the plastic was immersed in the heparin solution consisting of 0.5 gram of sodium heparin dissolved in 100 ml. of distilled water for about 22 hours. This was followed by a rinse in distilled water for 5 days and a 15 minute dip in normal saline.

Example 27

Plastic—Cellulose acetobutyrate.
Treating solution—5 gr. BiCl₃·H₂O 100 ml. acetone.
Temperature—56° C.
Time—3 minutes.

Example 28

Plexiglas—Polymethylmethacrylate.
Treating solution—5 g. BiCl₃—H₂O dissolved in 100 ml. acetone.
Temperature—56°.
Time—3 minutes.

Example 29

Polyurethane:
Treating solution—5 g. AlCl₃—H₂O dissolved in 20 ml. MEK 10 ml. HCl conc.
Temperature—70° C.
Time—2 minutes.
Heparin solution—0.5 g. sodium heparin; 5 g. NH₄Cl 2ml.·NH₄OH 58% dissolved in 100 ml. distilled water.

Example 30

Nylon 6.6:
Treating solution—(a) 5 g. BiCl₃—H₂O 10 ml. H₂SO₄ conc. 30 ml. distilled water cooling 40 ml. H₂SO₄.
Followed by—(b) Short dip in 10% NH₄OH.
Temperature—95° C.
Time—30 minutes.

Example 31

Nylon 6.6:
Treating solution—Saturated methanol—
SnCl₂—H₂O solution.
Temperature—70° C.
Time—30 minutes.

Example 32

Nylon 6.6:
Treating solution—5 g. SnCl₂—H₂O 10 ml. THF 60 ml. amylacetate.
Temperature—90° C.
Time—30 minutes.

Example 33

Nylon 6.6:
Treating solution—5 g. monochloracetic acid 5 g. AlCl₃—H₂O 20 ml. THF.
Followed by—(b) Dip in 10% NH₄OH.
Temperature—75° C.
Time—30 minutes.

Example 34
Polyethylene:
  Treating solution—Saturated methanol $SnCl_2$—$H_2O$ solution.
  Temperature—70° C.
  Time—30 minutes.

Example 35
Polyethylene:
  Treating solution—5 g. $SnCl_2$—$H_2O$ 10 ml. THF 60 ml. amylacetate.
  Temperature—90° C.
  Time—30 minutes.

Example 36
Polypropylene:
  Treating solution—2 gr. dibutyltin acetate in 18 ml. methanol.
  Temperature—Reflux.
  Time—5 minutes.

Heparin solution 0.5 g. sodium heparin in 5% ammonium hydroxide for 30 min. followed by 0.5 g. heparin in 100 ml. $H_2O$ for 3½ hours. Subsequent treatment: Immerse in 0.9% aqueous NaCl for 20 hours.

Although this invention has been described with reference to specific plastics, solvents and polyvalent metal salts it is contemplated that obvious modifications will readily occur to those skilled in the art and familiar with the principles herein set forth. In general, the process may be practiced with other organic polymers by treatment with a polyvalent metal salt dissolved in a solvent capable of swelling the plastic, but without dissolving it completely. Dissolution of the plastic may be prevented by proper selection of solvents, by mixing solvents with nonsolvents, by applying only a limited amount of solution so that dissolution does not occur, or by using plactics which are cross linked sufficiently that they swell but do not dissolve. Those skilled in the art are well familiar with these techniques concerning the effects of solvent-type liquids on organic polymers. Water miscible solvents are preferred, but ones not of themselves water miscible may be used, either mixed with water miscible solvents, or in a step followed by application of an intermediate solvent with which both it and water are miscible. The polyvalent metal salts referred to are known for their heparin-bonding capacity, but others may be found to exist by routine experimentation. In this connection it is hypothesized that the polyvalent metal salt is hydrolyzed by the aqueous treatment following the salt absorption, and that the hydrolyzate, i.e. the oxide or hydroxide, bonds with the heparin.

Having thus disclosed my invention and described in detail a preferred embodiment thereof I claim and desire to secure by Letters Patent:

1. A nonthrombogenic material comprising an organic polymeric plastic having a polyvalent metal hydrolyzate adsorbed at a surface and heparin bonded to said hydrolyzate, said metal and heparin being in amounts sufficient to render the surface nonthrombogenic.

2. A method for rendering an organic polymeric plastic nonthrombogenic comprising contacting a surface of said plastic with a solution of a polyvalent metal salt, in a solvent capable of swelling said plastic and then contacting said surface with an aqueous solution of heparin.

3. The method defined by claim 2 wherein the solvent is miscible with water.

4. A method for rendering an organic polymeric plastic nonthrombogenic comprising adsorbing a polyvalent metal salt at a surface of said plastic, hydrolyzing said salt, to form a hydrolyzate of said metal, and combining said hydrolyzate with heparin.

5. The method defined by claim 4 wherein the metal is selected from the group consisting of tin, zirconium, bismuth, aluminum, zinc, silver and antimony.

References Cited
UNITED STATES PATENTS
3,023,074   2/1962   Herschler _____ 8—130.1

OTHER REFERENCES
Falbet et al., "Development of Blood Compatible Polymeric Materials," Battelle Memorial Institute, Columbus, Ohio, June 22, 1966, pp. 17–18.

WILLIAM D. MARTIN, Primary Examiner

D. COHEN, Assistant Examiner

U.S. Cl. X.R.

117—69, 138.8; 424—183